United States Patent
Matich et al.

(10) Patent No.: US 6,989,783 B1
(45) Date of Patent: Jan. 24, 2006

(54) MULTIPLE TARGET RANGING SYSTEM

(75) Inventors: George Edward Matich, Basildon (GB); David Henry Ramsey, Pitsea (GB); Raymond John Walls, Chelmsford (GB)

(73) Assignee: BAE Systems Electronics Limited, Farnborough (GB)

( * ) Notice: Subject to any disclaimer, the term of this patent is extended or adjusted under 35 U.S.C. 154(b) by 1826 days.

(21) Appl. No.: 07/578,517

(22) Filed: Aug. 16, 1990

(51) Int. Cl.
*G01S 13/08* (2006.01)
(52) U.S. Cl. .................................... 342/145
(58) Field of Classification Search ............... 342/120, 342/122, 128, 145, 91
See application file for complete search history.

(56) References Cited

U.S. PATENT DOCUMENTS 4,078,234 A * 3/1978 Fishbein et al. ............ 342/145
4,328,495 A * 5/1982 Thue ........................ 342/145
4,357,610 A * 11/1982 Kingston et al. ........... 342/145
4,758,839 A 7/1988 Goebel et al.

FOREIGN PATENT DOCUMENTS

GB     1 509 646     5/1978
GB     2 122 449 A     1/1984

* cited by examiner

*Primary Examiner*—Mark Hellner
(74) *Attorney, Agent, or Firm*—Crowell & Moring LLP

(57) ABSTRACT

A continuous wave ranging system, comprising a modulator 2 for modulating an r.f. carrier wave in accordance with a pseudo-random code 3, a transmitting antenna 5 for radiating the modulated signal towards a target, a receiving antenna 6 and receiver 7 for detecting the signal reflected back from the target, a correlator 8 for correlating the reflected signal with a transmitted code with a selected phase shift 9 corresponding to the current range gate to be tested, and means 10, 11, 12 for processing the range/amplitude data from the correlator 8 to discriminate between reflections due to the target and those due to other objects adjacent to the target.

9 Claims, 4 Drawing Sheets

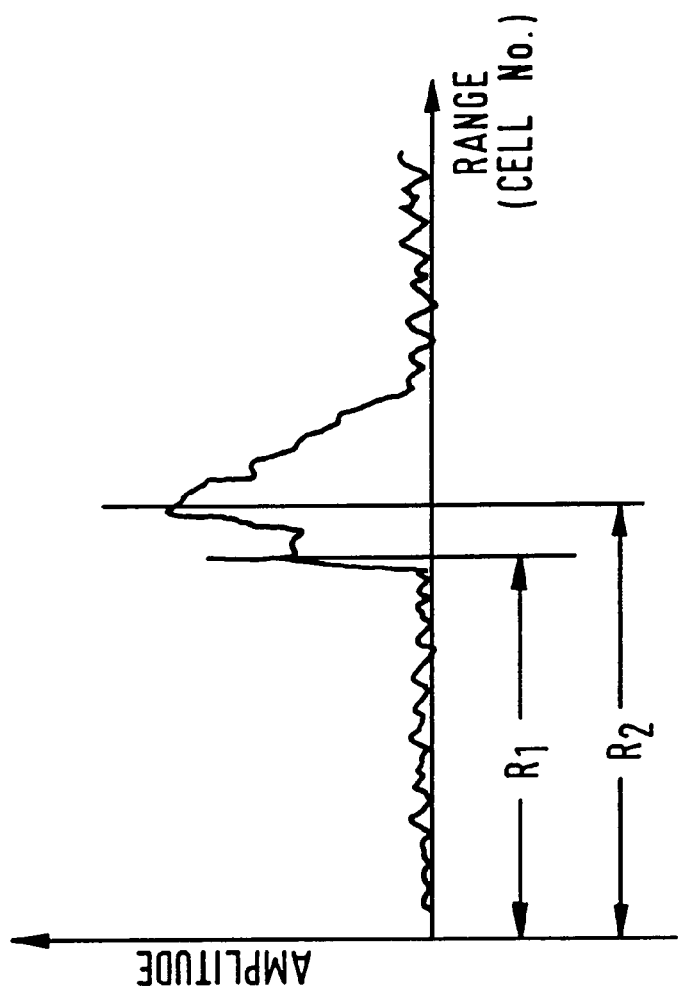
FIG.2
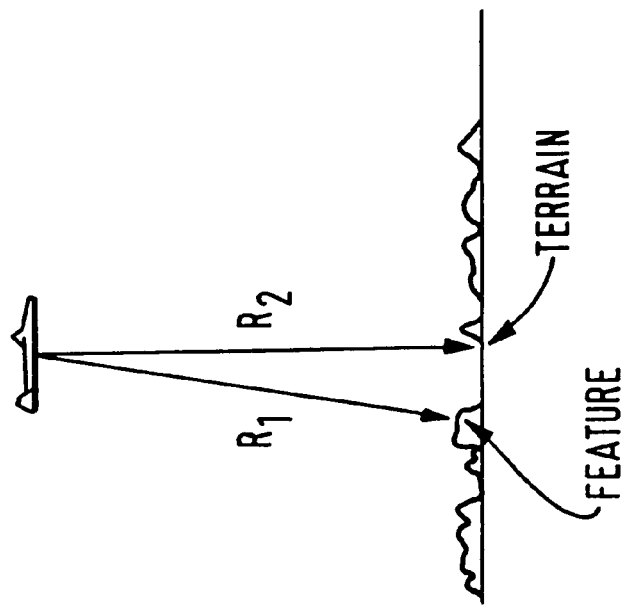

MULTIPLE TARGET RANGING SYSTEM

BACKGROUND OF THE INVENTION

This invention relates to a continuous wave ranging system and, in one aspect, to an aircraft radar altimeter system.

Such systems usually comprise a means of microwave transmission upon which some form of coding has been added, and antenna for directing the energy to the target, an antenna for receiving the returned energy and, after amplification, a means of determining the amount of delay that has occurred on the signal, and hence the range of the target. The coding on the transmission had in the past been pulse or frequency modulation, but more recently phase modulation from a pseudo-random code has been used. This form of modulation has the property of producing a noise-like transmitted spectrum which is difficult to detect and hence finds applications where covertness is of importance. Covertness can be enhanced by reducing the transmitted power such that the returned signal is just sufficient for ranging measurement.

In such phase-modulated systems, the received signal is correlated with a delayed version of the transmitted code, the delay being gradually increased in steps, and samples of the output of the correlator are detected and stored in an array. From this stored data, the delay, and hence the range, where the received signal return occurs, can be found.

Existing direct sequence spread spectrum ranging systems use techniques such as delay locked or Tau dither loops to track target ranges. These techniques result in a narrow tracking window and tracking loops with excellent dynamic performance. However, the narrowness of the tracking window restricts the ability of such systems to see any targets at ranges other than that being tracked.

SUMMARY OF THE INVENTION

According to the invention, a continuous wave ranging system comprises a modulator for modulating an r.f. carrier wave in accordance with a pseudo-random code, a transmitting antenna for radiating the modulated signal towards a target, e.g., the terrain or ground, a receiving antenna and receiver for detecting the signal reflected back from the target, a correlator for correlating the reflected signal with the transmitted code with a selected phase shift corresponding to the current range gate to be tested, and means for processing the range/amplitude data from the correlator to discriminate between reflections due to the target and those due to other objects adjacent to the target.

The pseudo-random code used in the invention is preferably a maximal length code, a sequence of numbers generated by a shift register with certain feedbacks on it. For the system of the present invention, a code length of 2047 digits is preferred.

BRIEF DESCRIPTION OF THE DRAWING

The present invention will now be described, by way of example, with reference to the accompanying drawings, in which:—

FIG. 2 shows a diagrammatic view of the application of the system and a typical signal received from such a system.

DETAILED DESCRIPTION OF THE PREFERRED EMBODIMENT

Figure 1:
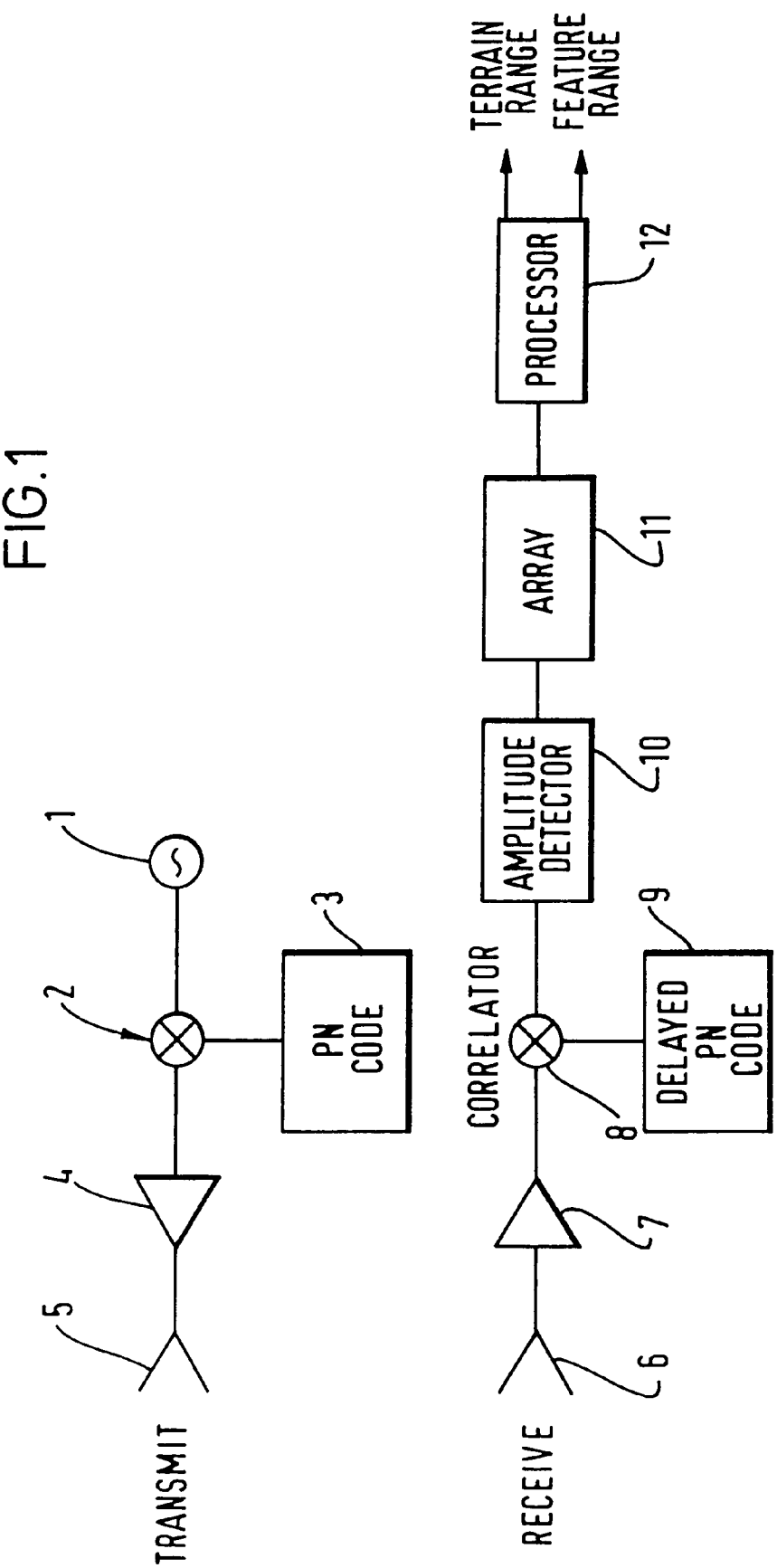
FIG. 1 shows a schematic block diagram of a system according to one embodiment of the invention.

Referring now to FIG. 1, the system shown therein comprises a transmitter having a signal generator 1, a modulator 2 for modulating the signal from the generator in accordance with a pseudo-random code, a transmitter amplifier 4, and a transmitter antenna 5. A receiver includes a receiver antenna 6, a receiver amplifier 7, a correlator 8 for correlating the received signal with a delayed version of the pseudo-random code 9 according to the range being determined, an amplitude detector 10, a memory array 11 and a processor 12 for analysing the signal stored in the array 11 to determine and output respective terrain and feature ranges.

A range scanning technique is used in the above system, where the receiver code is preferably dwelled at a given delay (range) for a fixed integration period enabling signal strength to be measured for each delay period. In turn, a picture of signal strength versus range is constructed for the entire measurement range of the system in the array 11. This picture will thus contain signal/range data for all targets as well as environment noise information, a typical result being shown in FIG. 2. From this picture, the predominant target range (terrain) R2 and less dominant shorter ranged targets (feature) R1 may be extracted by use of the processor 12. In order to formulate a robust predominant target extraction technique, regard must be given to target dynamics. It can be shown that a partial area algorithm applied about the predominant target range can significantly discriminate this target from shorter range returns which occur close to the predetermine target.

One particular method of extracting feature and terrain ranges will now be described with reference to FIGS. 3 and 4.

Figure 3:
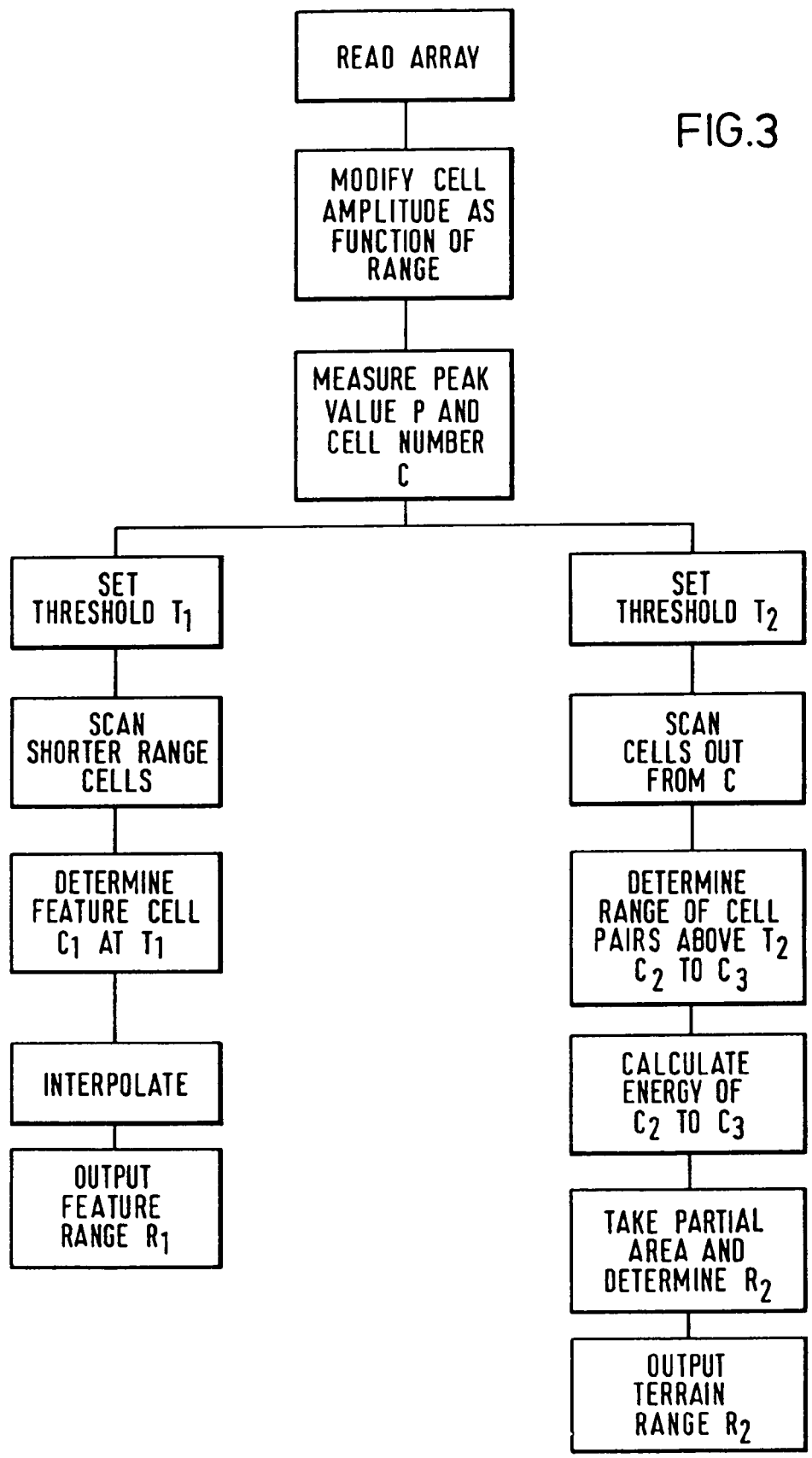
FIG. 3 shows one algorithm from the extraction of feature and terrain ranges from the system.
Figure 4:
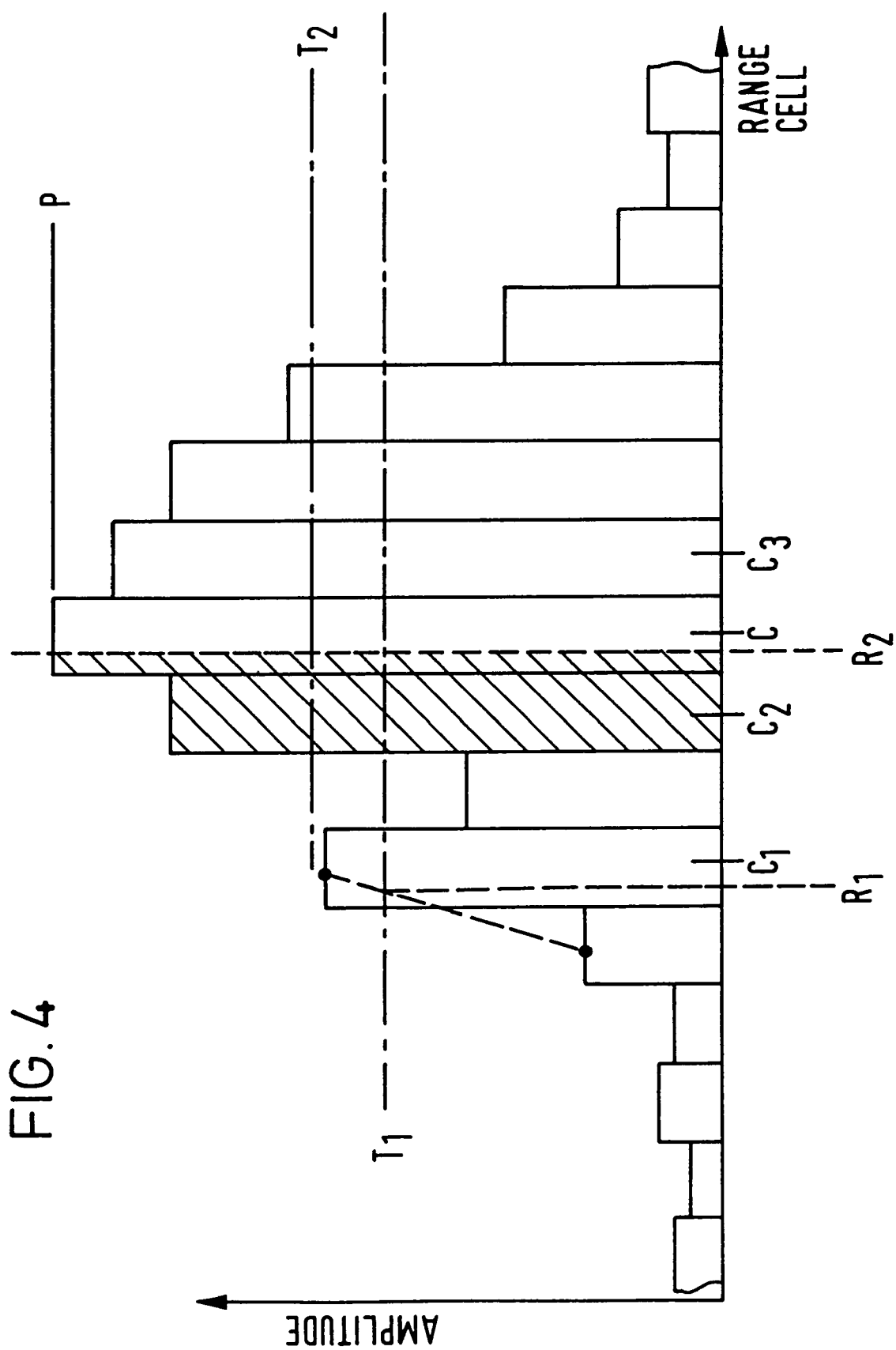
FIG. 4 shows a typical signal reading divided into range cells.

Referring now to FIGS. 3 and 4, in the processor 12 the array of amplitudes or signal strengths in the various range bands or range cells is read (in a first step S1), and the amplitudes are modified (S2) to compensate for the law of signal strength versus range, signals reducing at 9 dB/octave due to propagation factors. The cell with the largest amplitude (after compensation) is noted (C) and the amplitude value measured (S3).

The method of determining the range of a feature is as follows (left hand side of FIG. 3):—

A threshold (T1) is set at a fixed value below P as indicated at S4. This is typically 12 dB and a check is made that T1 is above the general noise level. A scan is made (S5) of the cells below C starting at a fixed number of cells below C. Typically the scan would start at the equivalent of 300 feet below C although a scan would not normally cover the first few cells, corresponding to ranges below say 15 feet. The cell C1 having the shortest range which has energy above T1 than is determined (S6). Interpolation is then made based on the energy in cell C1 and the energy in the next cell below cell C1 (S7), and from this interpolation R1 is calculated as the range where the T1 threshold is crossed and, after filtering, is output (S8).

The method of determining the range of the terrain is as follows (right hand side of FIG. 3):—

A threshold (T2) is set at a fixed value below P (S9). This need not be the same as T1 but is typically 12 dB when a good signal to noise ratio is obtained. Under poorer signal to noise conditions the threshold T2 will be closer to P. A scan (S10) is then made of pairs of cells, comprising one cell above cell C and the other below cell C, both by the same amount. When energy in either cell of the scanned pair falls below T2 the scanning is halted. The range of pairs of cells (C2–C3) that have energy above T2 is determined (S11). (In the example of FIG. 4, only the adjacent pair of cells meets this criterion). The energy in the range of cells C2–C3 is calculated (S12) and the area that contains a fixed fraction K of the total energy in cells C2–C3 is calculated (S13) its upper boundary giving the value of R2 (see FIG. 4). Typically a value of K is 0.375. After filtering, R2 is output (S14) as the range to the terrain. The amount of filtering applied to the terrain output can be greater than that of the feature if required.

Thresholds T1 and T2 are chosen so that features such as trees and buildings are accepted and measured, whilst returns from clouds and chaff are ignored.

What is claimed is:

1. A continuous wave ranging system, comprising an r.f. generator for generating an r.f. carrier wave, a modulator for modulating said r.f. carrier wave in accordance with a pseudo-random code, a transmitting antenna for radiating a modulated signal from said modulator towards a target, a receiving antenna and receiver for detecting a signal reflected back from said target, a correlator for correlating said signal reflected back from said target with said pseudo random code which incorporates a selected phase shift corresponding to a current range gate to be tested, and processing means for processing range/amplitude data from said correlator to discriminate between reflections due to said target and those due to other objects adjacent to said target at shorter ranges, and to produce respective range output signals corresponding to said target and said other objects.

2. A system as claimed in claim 1, wherein said processing means determines a first threshold with regard to an amplitude of received signals such that signals immediately above this first threshold are signals returned from said other objects.

3. A system as claimed in claim 2, wherein said processing means sets a second threshold such that an analysis of the energy distribution of so returned signals above said second threshold allows determination of said target range.

4. A system as claimed in claim 1, wherein said target is the ground and said other objects are features on the ground.

5. A system as claimed in claim 2, wherein said processing means makes an increasing range scan of returned signals from below a range of maximum returned signal strength until a returned signal strength is above said first threshold.

6. A system as claimed in claim 3, wherein said processing means makes a scan of pairs of signals above and below a range of maximum returned signal strength until one of said pairs includes a signal below said second threshold, calculates the total energy of said pairs above said first threshold, and determines the range of a fixed fraction of said total energy as the range of said target.

7. A system as claimed in claim 5 wherein said processing means calculates the energy in the shortest range cell whose amplitude exceeds said first threshold and in the immediately preceding range cell, and via interpolation calculates the range at which the energy in the shortest range cell and in the preceding range cell crosses said first threshold as the range of a said other object.

8. A system as define in claim 6 wherein: said target is the ground and said other objects are features on the ground; said first and second thresholds are fixed values below the maximum received amplitude in a range cell of a plurality of range cells, and are above the ground noise level of the received signals; and said second threshold is at least as great as said first threshold.

9. A system as claimed in claim 1 further comprising: means for detecting the amplitude of the output signals from said correlator in the respective range gates; a memory array for storing the output signals of said amplitude detecting means for the respective range gates; and wherein said processing means processes the stored data in said array corresponding to a plurality of said range gates to provide said respective plurality of range output signals.

* * * * *